United States Patent [19]

Nikly

[11] 4,428,340
[45] Jan. 31, 1984

[54] DIRECT INJECTION DIESEL ENGINE WITH A MECHANICALLY CONTROLLED INJECTOR

[75] Inventor: Jean Nikly, Caluire, France

[73] Assignee: Automobiles M. Berliet, Lyons, France

[21] Appl. No.: 362,775

[22] Filed: Mar. 29, 1982

Related U.S. Application Data

[63] Continuation of Ser. No. 952,337, Oct. 18, 1978, abandoned.

[30] Foreign Application Priority Data

Oct. 18, 1977 [FR] France .............................. 77 32000

[51] Int. Cl.³ ............................................. F02B 23/06
[52] U.S. Cl. ..................................... 123/276; 123/260; 123/261
[58] Field of Search ............... 123/276, 261, 270, 288, 123/279, 260

[56] References Cited

U.S. PATENT DOCUMENTS

| | | | |
|---|---|---|---|
| 3,094,974 | 6/1963 | Barber | 123/260 |
| 3,125,079 | 3/1964 | Hoffman | 123/262 |
| 3,908,624 | 9/1975 | Miyaka et al. | 123/276 |
| 3,954,089 | 5/1976 | Hardesty et al. | 123/276 |
| 4,127,089 | 11/1978 | Tsutsumi | 123/260 |
| 4,177,769 | 12/1979 | Okada et al. | 123/276 |

FOREIGN PATENT DOCUMENTS

| | | | |
|---|---|---|---|
| 1213980 | 4/1960 | France | 123/276 |
| 473697 | 8/1962 | Italy | 123/276 |

Primary Examiner—Raymond A. Nelli
Attorney, Agent, or Firm—Remy J. VanOphem

[57] ABSTRACT

In a diesel engine having one inlet valve and one exhaust valve, with an inlet passage having a spiral profile to create rotary air turbulence in a combustion chamber of at least 1.5 times the engine speed, an injector pump, driven by an engine camshaft, supplies high pressure fuel to a fuel injector mounted in the cylinder head, which injects the fuel into the combustion chamber. The injector, which includes a nozzle tip having 4 to 6 jets, is inclined from the axis of the cylinder bore at an angle i of equal to or less than 30 degrees. The injector is also eccentrically mounted from the axis of the cylinder bore at an eccentricity value e that is less than or equal to 0.2 times the bore of the cylinder D. Also, the depth H of the combustion chamber to outer diameter d of the combustion chamber is related by the ratio H/d which is greater than 0.2 but less than 0.5. The centerline of the axis of the combustion chamber is mounted at a distance I from the axis of the cylinder bore in a relationship to the diameter of the bore D by a parimeter I/D which is of equal to or less than 0.1. Adhering to the above design parameters reduces the fuel consumption in small diesel engines with one inlet valve and one exhaust valve.

7 Claims, 4 Drawing Figures

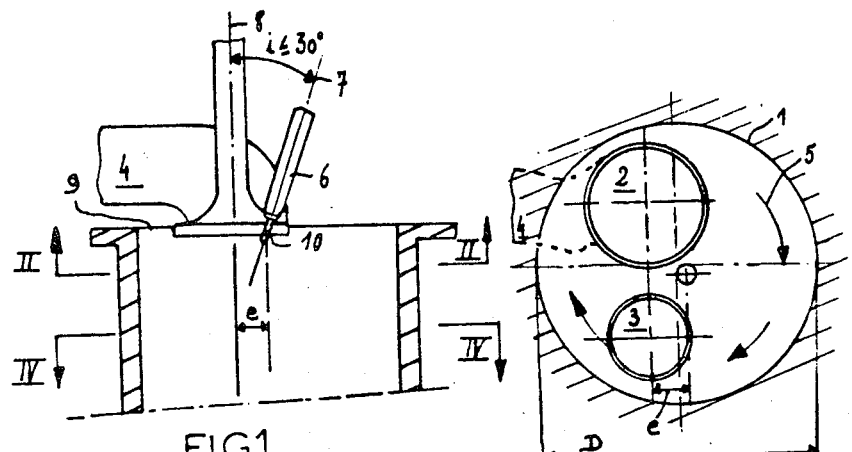
FIG.1
FIG.2
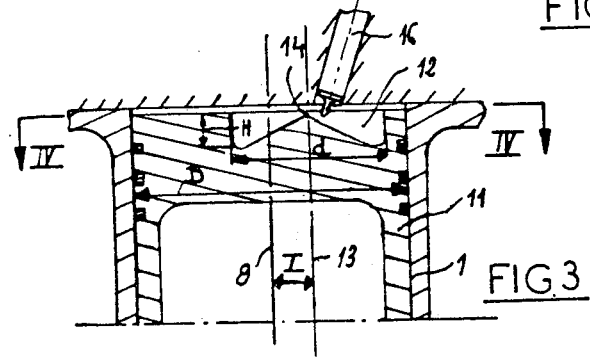
FIG.3
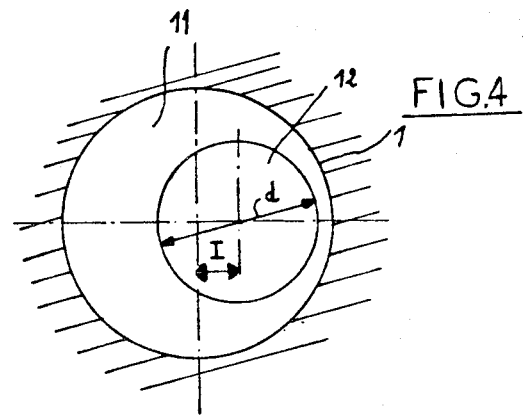
FIG.4

DIRECT INJECTION DIESEL ENGINE WITH A MECHANICALLY CONTROLLED INJECTOR

This is a continuation of application Ser. No. 952,337, filed Oct. 18, 1978, now abandoned.

BACKGROUND OF THE INVENTION

1. Field of the Invention

The present invention relates to a direct injection diesel engine mainly as regards the construction of the combustion chamber and its distribution and injection fittings.

2. Discussion of the Prior Art

In a first class of diesel engine of known type, each piston is covered by a cylinder head in which four valves are fitted (two valves for the inlet, two valves for the exhaust). In the central area situated between the four valves there is a mechanically controlled injector of which the axis is aligned perpendicularly to the plane of the cylinder head gasket. The mechanically controlled injector pump is supplied with fuel at low pressure, and is controlled by a camshaft located in the cylinder head or in the engine block which pressurizes the fuel so that the fuel is injected at very high pressure into the combustion chamber.

The advantages of the mechanically controlled injector are known, as it allows, among other things, the use of extremely short channels for the high pressure fuel circuit. Among other results, this generally avoids the use of any variator to adjust the injection advance automatically in relation to the speed of rotation of the engine.

The quality of the atomization and mixing of the fuel with the air in the cylinder is mainly insured by the nozzle of the mechanically controlled injector. This leads to the use of a relatively expensive and complicated nozzle, comprising principally including several drillings of extremely small diameter, which is difficult to manufacture. In addition, it is established that this type of injector cannot be used on engines of small bore.

In a second class of diesel engine of known type, the cylinder head has two valves per cylinder (an inlet valve and an exhaust valve). The inlet of air is introduced tangentially into the combustion chamber so as to create a large turbulence. The injector then is in an eccentric position and is an injector fed in the conventional manner by a high pressure channel of relatively great length. All the channels corresponding to the different cylinders of the engine are connected to a central injection pump. The advantages and disadvantages of this conventional injection system are known, it generally leading to the fitting to the pump of an automatic advance variator operating in relation to the speed of the engine. Such a diesel engine cylinder head is described in my earlier U.S. Pat. No. 4,214,560 issued July 29, 1980, now owned by the assignee of the present application under the title "Cylinder Head Improvement, Particularly For a Diesel Engine".

SUMMARY OF THE INVENTION

A primary object of the present invention is to achieve a new type of diesel engine cyliner head, able to combine the advantages of the above classes, without, however, having their disadvantages. More particularly, an object of the present invention is the quality of the combustion, that is to say, at reducing the specific combustion while allowing use on small bore engines, this bore being possible as small as 100 mm for example.

A diesel engine according to the present invention includes a cylinder a piston covered by a cylinder and head in which the inlet and exhaust valves as well as the fuel injector are mounted. The invention characterized by the following overall combination:

the head includes a single inlet valve and a single exhaust valve;

the injector is of the conventional type known as "mechanically controlled injector", but it occupies a position in the cylinder head inclined in relation to the axis of the bore; and the air inlet channel located in the head before the inlet valve seat is curved following a spiral profile in order to create an eddy by admitting the air tangentially into the cylinder.

Owing to the tubulence of the air which passes in front of the nozzle tip, the mechanically controlled injector may be made in a simple way, mainly as duel channel and the diameter and direction of the openings forming the injection jets. In addition, this allows the injector to be placed in the eccentric position in the cylinder head made necessary by the construction of an engine with only two valves.

Naturally the crown of the piston can likewise include a combustion chamber of the type conventionally used in the diesel engines known as "direct injection engines". Owing to the combination according to the invention, this piston chamber can also occupy an eccentric position in relation to the axis of the bore.

In a general way, it will be understood that the construction according to the invention may be used even on small bore diesel engines (down to 100 mm), while benefiting from the advantages of the mechanically controlled injector and without it being necessary to have recourse to costly and complicated solutions such as the use of four valves per cylinder so as to obtain the appropriate homogeneous fuel/air mixtures.

BRIEF DESCRIPTION OF THE DRAWINGS

The attached drawings, given by way of example, will allow a better understanding of the invention, and its advantages to be appreciated.

FIG. 1 is a diagrammatic view in axial section of the cylinder head according to the invention fitted over the bore of a diesel engine;

FIG. 2 is a plan view along section II—II (FIG. 1);

FIG. 3 is a section similar to that in FIG. 1 showing a combustion chamber hollowed into the crown of the piston and FIG. 4 is a plan view along the section IV—IV (FIGS. 1 and 4).

DESCRIPTION OF THE PREFERRED EMBODIMENT

There is shown in FIGS. 1 and 2 a diesel engine cylinder head fitted above the bore 1 of a cylinder. This bore has a diameter D.

Above this bore 1 the cylinder head carries a single inlet valve 2, and a single exhaust valve 3. Above the inlet valve 2 there is an air inlet port 4 which as illustrated in FIG. 2 possesses a profile in the shape of a curve. Such a shape is disclosed in my earlier U.S. Pat. No. 4,214,560 referenced above. Owing to the profile of the inlet port 4, it is known that the air introduced into the cylinder when the piston 11, as shown in FIG. 3, descends, is swirled in a rapid rotational movement shown diagrammatically by the arrows 5, illustrated in FIG. 2. There is thus created in the combustion chamber a strong turbulence of air of which the speed of rotation is at least equal to 1.5 times that of the engine rotational speed.

According to the present invention a mechanically controlled injector 6 is also fitted in the cylinder head, its axis 7 being inclined at an angle i in relation to the axis 8 of the bore.

In addition, the axis 7 of the injector pump cuts the junction plane 9 of the cylinder head at a point 10 which closely approximates the tip of the injection nozzle. This point is located at a distance e from the axis 8 of the bore.

As shown in FIG. 3, the piston 11, which moves in the bore 1, is hollowed out in its crown to form a combustion chamber 12 of a type which is in itself known. This combustion chamber has a profile of revolution about an axis 13 which is parallel to the axis 8 of the bore 1. The distance I which separates the axes 8 and 13 constitutes the eccentricity of the combustion chamber 12.

The maximum depth H of the combustion chamber 12 is measured parallel to the axis 8 of the bore. This maximum depth is situated close to the periphery of the combustion chamber 12. It will be seen in FIG. 4 that the combustion chamber 12 of diameter d is in an eccentric position in the crown of the piston 11.

The essential characteristic of the present invention consists of using the following combination.

The cylinder head carries only two valves, namely an inlet valve 2 and an exhaust valve 3.

The injection is carried out by a mechanically controlled injector 6 which occupies in the cylinder head a position inclined at an angle i.

The inlet port 4 for the air inlet follows a spiral path above the inlet valve 2, so that the air admitted into the cylinder is given a strong rotary turbulence following the direction shown by the arrows 5 in FIG. 2.

Following a preferred embodiment of the invention, the above combination permits the best results when the dimensions or characteristics satisfy the following conditions:

$i \leq 30°$ $e \leq 0.2D$

In addition, as regards the mechanically controlled injector 6, the perforated tip of its nozzle carries perforations which from the injection jets. The number of these perforations is 4 to 6 (which gives 4 to 6 injection jets).

Finally, as for the piston 11, its characteristics will for preferance satisfy the following inequalities:

$0.2 < (H/d) 0.5$ $(I/D) \leq 0.1$

In practice, the mechanically controlled injector 6 may be eccentric up to 20% of the bore, and it may be inclined up to 30° in relation to the axis 8 of the cylinder. Its nozzle tip carries a maximum of 6 injection holes. The shape of the injection pressure curve in relation to the speed of the engine, as well as the maximum pressure level, may be adjusted by the shape of the cam controlling the injector 6, and in relation to the rigidity of the control. The choice of this rigidity may, if need be, lead to the interposal of an elastic component in the control. All this allows the injection pressure at the tip of the mechanically controlled injector 6 to be regulated precisely. In any case, the turbulence created by the rotation of the inlet air strongly sweeps the tip of the injector pump 6 and is favorable to the homogeneity of the combustion mixture.

What is claimed as novel is as follows

1. A diesel engine of the type having a cylinder block with a top surface, a bottom surface opposite said top surface, and at least one cylinder bore extending from said top surface to said bottom surface, said at least one cylinder bore having a first predetermined diameter and a central axis; a piston mounted in said at least one cylinder bore for reciprocating from a first predetermined bottom position; a cylinder head mounted to said top surface of said cylinder block, said cylinder head further having an inlet valve, an exhaust valve mounted adjacent said inlet valve and means for communicating said inlet and exhaust valves with said at least one cylinder bore; a source of fuel; air intake source means; mechanical fuel injection means mounted in said cylinder head adjacent to said at least one cylinder bore and said fuel source for injecting fuel into said at least one cylinder bore; a camshaft member mounted in said cylinder block; means for rotatably driving said camshaft such that said camshaft rotates in turned relationship with the reciprocation of said piston from a first predetermined top position to a second predetermined bottom position, wherein the improvement comprises:

a combustion cavity recessed a predetermined depth into said piston, said combustion cavity having an outer diameter and a central axis located a predetermined eccentric distance from the central axis of said at least one cylinder bore; said predetermined depth of said recess being from 0.20 to 0.50 times the outer diameter of said combustion cavity; said predetermined eccentric distance being equal to or less than one tenth of said first predetermined diameter of said at least one cylinder bore;

an intake port surrounding said inlet valve for receiving said air source means;

a spiral contoured inlet passage located in said intake port such that said air intake source means entering said intake port is swirled tangentially into said combustion cavity when said inlet valve opens to communicate with said at least one cylinder bore; and said mechanical fuel injection means further comprising injection means connected to said camshaft for injecting pressurized and metered fuel into said at least one cylinder bore in response to the direct mechanical actuation of said camshaft such that the correct amount of pressurized fuel is supplied into said at least one cylinder bore in relation to the rotation of the engine free of the use of an injection advance device responsive to engine speed, said injection means further comprising a fuel nozzle having a central axis and a tip extending into said combustion cavity, said tip being located a predetermined distance from the central axis of said at least one cylinder bore; said fuel nozzle further being inclined at a predetermined angle with respect to the central axis of said combustion cavity, said central axis of said fuel nozzle being a third predetermined distance from said central axis of said at least one cylinder bore when measured along a plane coinciding with said first predetermined top position of said piston, whereby when said inlet valve is opened, air from said air intake source means is swirled tangentially into said combustion cavity to mix with fuel injected into said combustion cavity by said mechanical fuel injection means to form a homogeneous combustible mixture so that said mixture reduces fuel consumption in a diesel engine.

2. The diesel engine combination as claimed in claim 1 wherein said spiral contoured inlet passage tangentially swirls the air entering into said combustion cavity at a speed of at least 1.5 times the speed of rotation of the engine.

3. The diesel engine combination as claimed in claim 1 wherein said mechanical fuel injection means further comprises:
said nozzle tip having orifice means for spraying fuel into said combustion cavity; and
wherein said mechanical fuel injection means further includes elastic component means for precisely regulating the fuel pressure.

4. The diesel engine combination as claimed in claim 3 wherein said orifice means has more than 3 but less than 7 jets.

5. The diesel engine combination as claimed in claim 1 wherein said predetermined angle of said fuel nozzle with said central axis of said at least one cylindrical bore is 30 degrees.

6. The diesel engine combination as claimed in claim 1 wherein said predetermined angle of said fuel nozzle with said central axis of said at least one cylindrical is less than 30 degrees.

7. A diesel engine of the type having a cylinder block with a top surface, a bottom surface opposite said top surface, and at least one cylinder bore extending from said top surface to said bottom surface, said at least one cylinder bore having a first predetermined diameter and a central axis; a piston mounted in said at least one cylinder bore for reciprocating from a first predetermined top position to a second predetermined bottom position; a cylinder head mounted to said top surface of said cylinder block, said cylinder head further having an inlet valve, an exhaust valve mounted adjacent said inlet valve and means for communicating said inlet and exhaust valves with said at least one cylinder bore; mechanical fuel injection means mounted in said cylinder head adjacent to said at least one cylinder bore for injecting fuel into said at least one cylinder bore; fuel source means and air intake source means, wherein the improvement comprises:
a combustion cavity recessed a predetermined depth into said piston, said cavity having an outer diameter and a central axis located a predetermined eccentric distance from the central axis of the cylinder bore; said predetermined depth of said recess being from 0.20 to 0.50 times the outer diameter of said combustion cavity, said predetermined distance between the central axis of the cylinder bore and the central axis of the combustion cavity being defined as the eccentricity of the combustion chamber and further being equal to or less than one tenth the diameter of said at least one cylinder bore;
an intake port surrounding said inlet valve for receiving said air source means;
a spiral contoured inlet passage located in said intake port such that said air source means entering said intake port is swirled tangentially into said combustion chamber when said inlet valve opens to communicate with said cylinder bore, said spiral contoured inlet passage tangentially swirling the air entering said combustion chamber at a speed of at least 1.5 times the speed of the rotation of the engine; and
said mechanical fuel injection means further comprising injection means for injecting pressurized and metered fuel into said at least one cylinder bore in response to the direct mechanical actuation of said injection means such that the correct amount of pressurized fuel is supplied into said at least one cylinder bore in relation to the rotation of the engine free of the use of an injection advance device responsive to engine speed, said injection means further comprising a fuel nozzle having a central axis and a tip extending into said combustion cavity, said tip being located at predetermined distance of less than or equal to two tenths (0.2) times the cylinder bore diameter from the central axis of the cylinder bore; said fuel nozzle further being inclined at a predetermined angle of less than thirty (30) degrees with respect to the central axis of said combustion cavity, said central axis of the fuel nozzle being a third predetermined distance from said central axis of said at least one cylinder bore when measured along a plane coinciding with said first predetermined top position of the piston, whereby when said inlet valve is opened, air from said air source means is swirled tangentially into said combination chamber to mix with fuel injected into said combustion chamber by said mechanical fuel injection means to form a homogeneous combustible mixture so that said mixture reduces fuel consumption in a diesel engine.

* * * * *

UNITED STATES PATENT AND TRADEMARK OFFICE
CERTIFICATE OF CORRECTION

PATENT NO. : 4,428,340
DATED : January 31, 1984
INVENTOR(S) : Jean Nikly

It is certified that error appears in the above-identified patent and that said Letters Patent is hereby corrected as shown below:

Column 1, line 38, delete "comprising".

Column 1, line 67, after "invention is" insert ---- improving ----.

Column 2, line 62, after "which" insert a comma ---- , ----.

Column 2, line 63, after "Fig. 2" insert a comma ---- , ----.

Column 3, line 6, after "invention" insert a comma ---- , ----.

Column 3, line 50, delete "from" and insert ---- form ----.

In the Claims

Column 6, line 34, delete "at" and insert ---- a ----.

Signed and Sealed this

First Day of January 1985

[SEAL]

Attest:

GERALD J. MOSSINGHOFF

Attesting Officer

Commissioner of Patents and Trademarks